United States Patent Office 3,706,803
Patented Dec. 19, 1972

3,706,803
BIS(PHENOXYBENZOYL) AROMATIC COMPOUNDS
Robert Salle, Bernard Sillion, and Gabriel de Gaudemaris, Grenoble (Isere), France, assignors to Institut Francais du Petrole des Carburants et Lubrifiants, Rueil Malmaison, Hauts-de-Seine, France
No Drawing. Filed Dec. 4, 1969, Ser. No. 882,322
Claims priority, application France, Dec. 17, 1968, 179,056
Int. Cl. C07c 49/76
U.S. Cl. 260—591
13 Claims

ABSTRACT OF THE DISCLOSURE

For use as heat exchange fluids or lubricants, there are provided aromatic and heterocyclic ketoethers of the formula:

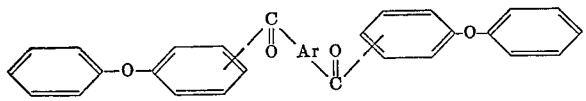

These compounds are produced by reacting a magnesium derivative of a halodiphenylether with an aromatic dinitrile.

---

This invention relates to new aromatic ketoethers which may be used as lubricants exhibiting a high stability with respect to heat and oxidation, or as heat transfer fluids.

The compounds according to this invention comply with the formula

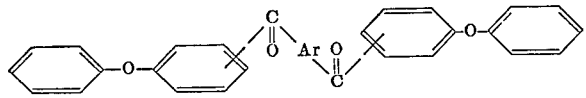

wherein the benzene rings may be substituted, for example with trifluoromethyl radicals, and wherein the Ar radical which has, for example, from 4 to 13 carbon atoms, may be an aromatic homocyclic or heterocyclic radical or may consist of two aromatic homocyclic or heterocyclic radicals which are joined or linked to each other through a direct bond or a junction group such as —CH$_2$—, —O— or —S—.

As examples of compounds according to this invention, there will be mentioned those wherein the divalent Ar radical is a phenylene radical in which the two valencies are in meta or para position with respect to each other, those wherein the divalent Ar radical is a divalent radical derived from biphenyl, diphenylmethane, diphenylether or diphenylsulfide, as well as the pyridylene radical.

The products of this invention are preferably obtained by reacting a magnesium derivative of an aromatic haloether with an aromatic dinitrile.

The haloethers employed conform to the general formula:

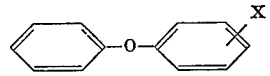

in which X is a halogen atom which may be chlorine, bromine or iodine, and in which the two benzene rings may be substituted with atoms or groups other than the halogen atom X, for example with trifluoromethyl groups.

As preferred aromatic haloether, the 3-bromo diphenylether will be mentioned; said ether may be manufactured, for example, by reacting meta-dibromobenzene with potassium phenate. There are also used, 3-chloro diphenylether, 2-bromo diphenylether, 4-bromo diphenylether, as well as mixtures thereof.

The aromatic dinitriles which are used according to this invention conform to the formula N≡C—Ar—C≡N, in which Ar is a divalent aromatic radical such as hereabove defined.

Amongst these compounds, those which contain one or two aromatic rings are preferred, for example isophthalonitrile, terephthalonitrile, 4,4'-dicyano biphenyl, 2,4'-dicyano biphenyl, 4,4'-dicyano diphenylmethane, 4,4'-dicyano diphenylether, 4,4'-dicyano diphenylsulfide and 3,5-dicyano pyridine.

The condensation reaction of the dinitrile with the magnesium derivative of the haloether is preferably carried out by heating the reactants in the absence of wetness, said reactants being dissolved in anhydrous organic solvents which may contain an ether group, for example ethyl ether or tetrahydrofuran, or which may be aromatic, for example benzene, toluene or xylene. The reaction is usually carried out with stoichiometrical amounts of the two reactants, i.e. 2 molecules of haloether per molecule of dinitrile, or otherwise using a slight excess (for example 1 to 10%) of haloether to provide for the total conversion of the dinitrile. The reaction product may be separated after hydrolysis according to known processes.

The following examples are illustrative of this invention.

EXAMPLE 1

The magnesium derivative of 3-bromo diphenylether is manufactured from 2.55 g. of magnesium and 24.9 g. of 3-bromo diphenylether dissolved in ether. The heating at reflux is continued for 2 hours after the end of the addition of 3-bromo diphenylether, then the most part of the ether is removed by distillation under reduced pressure.

50 ml. of anhydrous benzene are added thereto, and 6.08 g. of isophthalonitrile are added stepwise to the solution maintained at the reflux temperature. The heating at reflux is continued for 3 hours in a dry atmosphere, and the reaction mixture is then cooled down. After addition of ice, 50 ml. of 6 N HCl are added. After decomposition, the mixture is extracted with 750 ml. of an ether-benzene mixture (2 volumes for 1 volume) and the organic layer is separated and then washed with a 10% solution of sodium carbonate and finally with water up to neutrality. After drying on sodium sulfate, the solvents are evaporated under reduced pressure which results in a residue of 21.3 g.

By heating up to 200° C. under 5.10$^{-2}$ mm. Hg, there is obtained 1.5 g. of diphenyl ether which distills; there remains 19.8 g. of 1,3-bis(meta-phenoxy benzoyl) benzene in the form of a very viscous liquid which exhibits the following characteristics:

dynamic viscosity at 80° C.: 1112 centipoises
dynamic viscosity at 90° C.: 428 centipoises
dynamic viscosity at 100° C.: 194 centipoises

EXAMPLE 2

Example 1 has been repeated, except that isophthalonitrile has been substituted with an equivalent amount of terephthalonitrile, and 19.5 g. of 1,4-bis (meta-phenoxybenzoyl) benzene have been obtained. This product is liquid under the normal temperature and pressure conditions.

EXAMPLE 3

The magnesium derivative of 3-bromo diphenylether is manufactured from 1.3 g. of magnesium and 12.4 g. of 3-bromo diphenylether dissolved in anhydrous benzene.

The solution is heated up to reflux under inert atmosphere. 5 g. of 4,4'-dicyano diphenylether are added stepwise, and the heating is continued at reflux for 3 hours. After cooling, ice and 6 N hydrochloric acid are added to decompose the product. After 2 hours reflux, the mixture is cooled down and extracted with ether. The ether extract is washed with a sodium carbonate solution and then with water, and is finally dried with sodium sulfate. Ether is evaporated therefrom and there is obtained a residuum which is heated up to 200° under $3,10^{-2}$ mm. Hg to remove the traces of the diphenylether therefrom.

This residuum (8.9 g.) is 4,4'-bis (meta-phenoxybenzoyl) diphenylether melting at 101–103° C.

EXAMPLE 4

Example 3 has been repeated except that 4,4'-dicyano diphenylether has been substituted with the same amount of 3,3'-dicyano diphenylether. The reaction has been carried out in benzene. The operating conditions remained unchanged with respect to those of Example 3. This resulted in 8.7 g. of residuum which was liquid at room temperature, said residuum consisting of 3,3'-bis (meta-phenoxy benzoyl) diphenylether.

EXAMPLE 5

Example 3 has been repeated except that 4,4'-dicyano diphenylether is substituted with the same amount of 4,4'-dicyano diphenylsulfide and benzene is substituted with tetrahydrofuran.

This resulted in 8.5 g. of 4,4'-bis (meta-phenoxybenzoyl) diphenylsulfide.

EXAMPLE 6

Example 3 has been repeated with 4,4'-dicyano diphenylether substituted with the same amount of 2,4'-dicyano biphenyl, the solvent being anhydrous ethyl ether.

This resulted in 9.1 g. of 2,4'-bis(meta-phenoxy benzoyl) biphenyl.

EXAMPLE 7

Example 3 has been repeated with 4,4'-dicyano diphenylether substituted with the same amount of 4,4'-dicyano diphenylmethane, the solvent being anhydrous ethyl ether. This resulted in 8.8 g. of 4,4'-bis(meta-phenoxy benzoyl) diphenylmethane.

EXAMPLE 8

Isophthalonitrile of Example 1 has been substituted with 6.1 g. of 3,5-dicyano pyridine, the conditions being the same as in Example 1 and the solvent being anhydrous toluene.

This resulted in 19.9 g. of 3,5- bis (meta-phenoxy benzoyl) pyridine which is liquid under the normal temperature and pressure conditions.

What we claim as our invention is:

1. A ketoether of the formula:

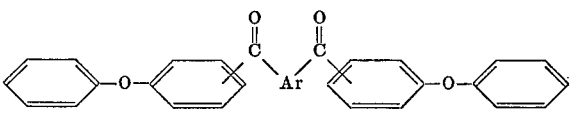

wherein Ar is phenylene having the two valences meta or para with respect to each other, or a divalent radical derived from biphenyl, diphenylmethene, diphenylether or diphenylsulfide.

2. A ketoether as defined by claim 1, said ketoether being 1,3-bis(meta-phenoxy benzoyl) benzene.
3. A ketoether as defined by claim 1, said ketoether being 1,4-bis(meta-phenoxybenzoyl) benzene.
4. A ketoether as defined by claim 1, said ketoether being 4,4'-bis(meta-phenoxybenzoyl) diphenylether.
5. A ketoether as defined by claim 1, said ketoether being 3,3'-bis(meta-phenoxy benzoyl) diphenylether.
6. A ketoether as defined by claim 1, said ketoether being 4,4'-bis(meta-phenoxy benzoyl) diphenylsulfide.
7. A ketoether as defined by claim 1, said ketoether being 2,4'-bis(meta-phenoxy benzoyl) biphenyl.
8. A ketoether as defined by claim 1, said ketoether being 4,4'-bis(meta-phenoxy benzoyl) diphenylmethane.
9. A ketoether as defined by claim 1 wherein Ar is said phenylene.
10. A ketoether as defined by claim 1 wherein Ar is said divalent radical derived from biphenyl.
11. A ketoether as defined by claim 1 wherein Ar is said divalent radical derived from diphenylmethane.
12. A ketoether as defined by claim 1 wherein Ar is said divalent radical derived from diphenylether.
13. A ketoether as defined by claim 1 wherein Ar is said divalent radical derived from diphenylsulfide.

References Cited

FOREIGN PATENTS 1,019,458   2/1966   Great Britain _____ 260—297

OTHER REFERENCES

Dilthey et al.: Chem. Abstracts, vol. 24, No. 7, pp. 1855–6, 1930.

ALAN L. ROTMAN, Primary Examiner

U.S. Cl. X.R.

252—52, 73, 77; 260—297 R